United States Patent
Kanke et al.

[11] Patent Number: 5,448,154
[45] Date of Patent: Sep. 5, 1995

[54] CONTROL DEVICE FOR BATTERY CHARGING AC GENERATOR USED IN MOTOR VEHICLE

[75] Inventors: Atsushi Kanke; Katsuji Marumoto, both of Hitachi; Keiichi Mashino, Katsuta; Yuuji Maeda; Shouju Masumoto, both of Hitachiota; Naoyuki Takahashi, Katsuta; Shuuichi Kokubun, Naka, all of Japan

[73] Assignees: Hitachi, Ltd., Tokyo; Hitachi Automotive Engineering Co., Ibaraki, both of Japan

[21] Appl. No.: 83,286

[22] Filed: Jun. 29, 1993

[30] Foreign Application Priority Data

Jul. 3, 1992 [JP] Japan ..................... 4-177100
Jul. 7, 1992 [JP] Japan ..................... 4-179919

[51] Int. Cl.$^6$ .................................... H02P 9/00
[52] U.S. Cl. ......................... 322/28; 322/25; 322/22
[58] Field of Search ............... 322/28, 27, 22, 24, 322/25, 94

[56] References Cited

U.S. PATENT DOCUMENTS

| | | | |
|---|---|---|---|
| 4,636,706 | 1/1987 | Bowman et al. | 322/28 |
| 4,739,243 | 5/1988 | Iwatani | 322/10 |
| 4,754,212 | 6/1988 | Mashino | 322/28 |
| 5,079,496 | 1/1992 | Pierret et al. | 322/28 |
| 5,105,143 | 4/1992 | Marumoto et al. | 322/28 |
| 5,140,253 | 8/1992 | Itoh | 322/28 |

FOREIGN PATENT DOCUMENTS

| | | | |
|---|---|---|---|
| 408030A2 | 7/1990 | European Pat. Off. | H02J 7/24 |
| 3722762C2 | 7/1987 | Germany | |
| 3914863A1 | 5/1989 | Germany | H02J 7/14 |
| 4120066A1 | 6/1991 | Germany | |
| 62-64299 | 3/1987 | Japan | |
| 62-14500 | 5/1987 | Japan | |
| 63-18933 | 1/1988 | Japan | |
| 1283030 | 11/1989 | Japan | |
| 2184300 | 7/1990 | Japan | |

Primary Examiner—Steven L. Stephan
Assistant Examiner—Robert Nappi
Attorney, Agent, or Firm—Antonelli, Terry, Stout & Kraus

[57] ABSTRACT

A control device for a battery charging AC generator for a motor vehicle including a power transistor connected in series with a field winding of the AC generator for performing switching control of a current flowing through the field winding. A voltage deviation circuit detects a deviation of the battery voltage from a reference voltage; and a PWM signal generating circuit is responsive to a voltage deviation signal from the voltage deviation circuit for turning the power transistor on and off a resistor connected in series with the power transistor detects a current flowing through the field winding; and a current limiting circuit generates a turn off signal for the power transistor when the detected current is determined to have exceeded a reference current. A latch circuit operates in response to a clock signal from the PWM signal generating circuit to limit the frequency of turning on and off of the power transistor to below 1 KHz.

13 Claims, 12 Drawing Sheets

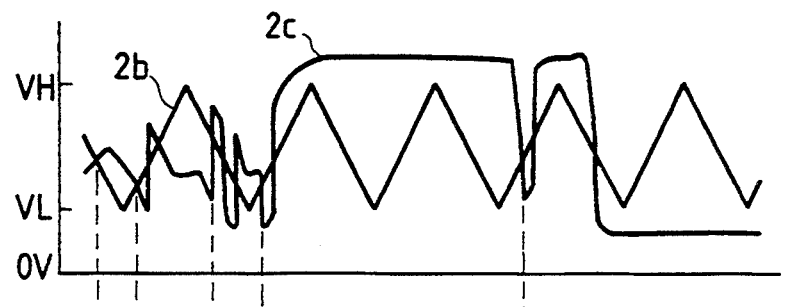
FIG. 2(a) COMPARATOR INPUT 2b 2c
FIG. 2(b) PWM SIGNAL GENERATING CIRCUIT OUTPUT 2d
FIG. 2(c) OSCILLATOR OUTPUT 2a
FIG. 2(d) CURRENT DETECTING CIRCUIT OUTPUT 4a
FIG. 2(e) LATCH CIRCUIT OUTPUT 1e
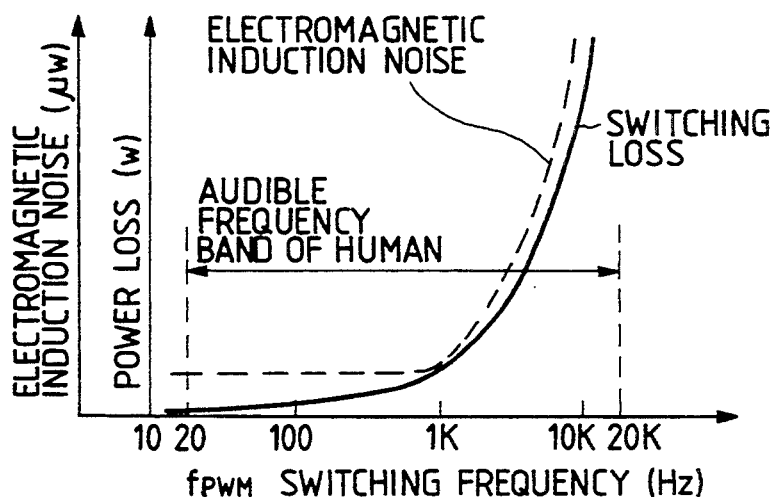
FIG. 3

OPERATING FUNCTION TABLE

| INPUT DATA D | CLOCK CLK | OUTPUT 420a |
|---|---|---|
| 1 | 0 | 1 |
| 0 | 1 | 0 |
| 1 | 1 | HOLD |
| 0 | 0 | HOLD |

OPERATION TIMING CHART

FIG. 14
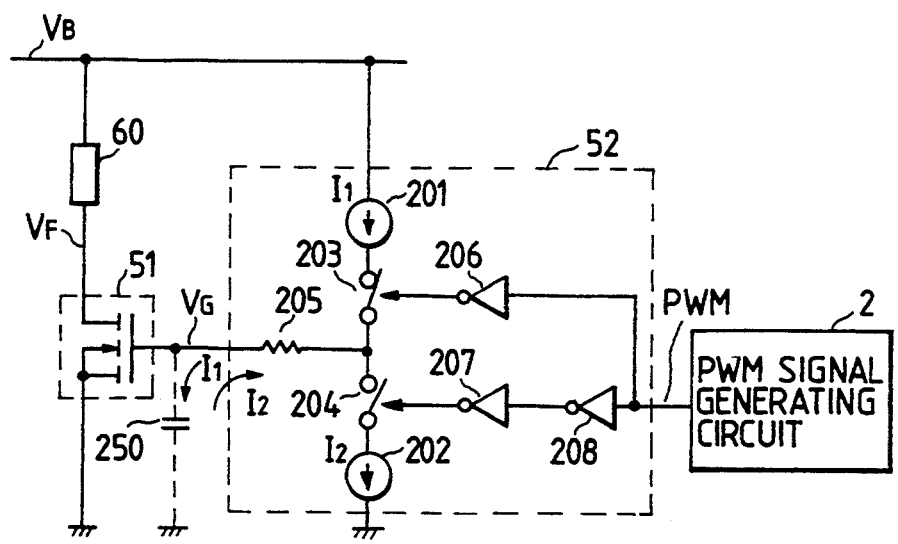
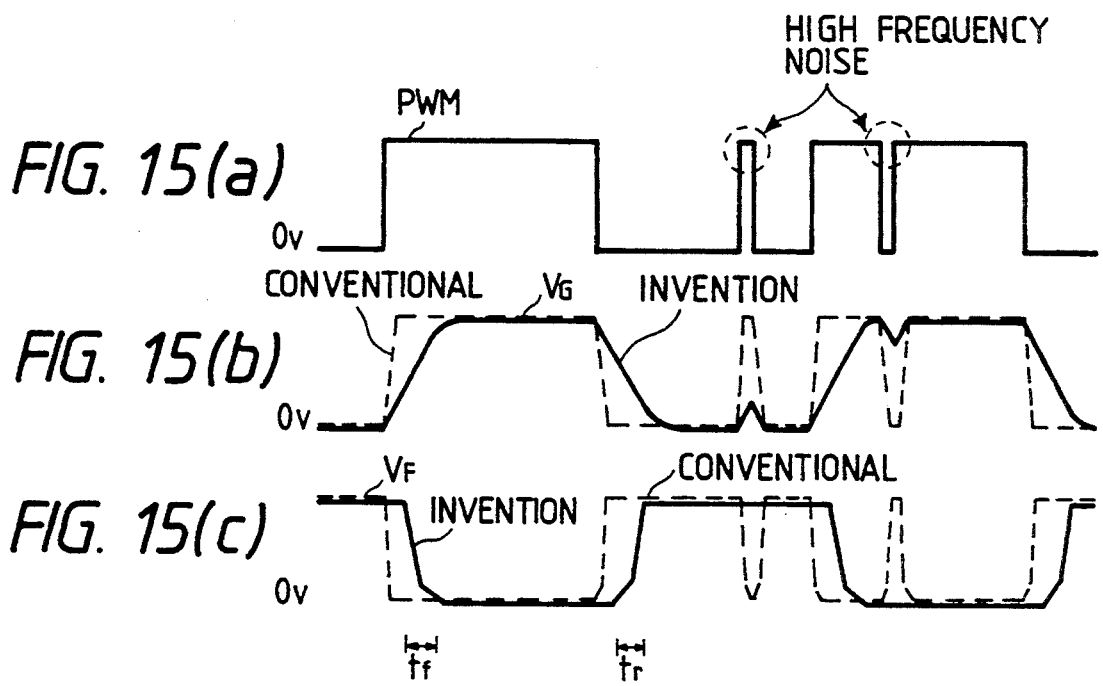
FIG. 15(a)
FIG. 15(b)
FIG. 15(c)

CONTROL DEVICE FOR BATTERY CHARGING AC GENERATOR USED IN MOTOR VEHICLE

BACKGROUND OF THE INVENTION

The present invention relates to a control device for a battery charging AC generator used in a motor vehicle, and, in particular, relates to a semiconductor control device for controlling the output voltage of a battery charging AC generator driven by an internal combustion engine via a belt in a motor vehicle.

Motor vehicles using an internal combustion engine as their propelling power source, such as automobiles, require many kinds of electrical devices. Among the required electrical devices some of them such as a starter are required to be operated even when the internal combustion engine is in a stand-still condition.

Therefore, it is a common practice in such motor vehicles to provide a battery and to charge the battery using a generator driven by the internal combustion engine in order to supply electric power to the respective electrical devices. For this reason, in such motor vehicles, a battery charging control device is used which controls the output voltage of the generator so that the battery is always kept in a proper charging condition.

In such a battery charging control device, a generating voltage control at a proper level is performed by controlling the current, particularly the field current, flowing through the field winding of the generator for the motor vehicle.

JP-A-1-283030(1989) discloses one example of conventional semiconductor battery charging control devices in which a semiconductor power switching element is used and the field current is controlled by means of pulse width modulation (PWM) through on-off control of the semiconductor power switching element.

JP-A-63-18933(1988), which corresponds to U.S. Pat. No. 4,754,212, discloses another example of conventional semiconductor battery charging control devices in which a generated output voltage is regulated by making use of an output condition of a semiconductor power switching element as indicated by a flip-flop circuit.

JP-A-62-64299(1987), which corresponds to U.S. Pat. No. 4,636,706, and JP-A-2-184300(1990), which corresponds to U.S. Pat. No. 5,140,253, disclose further examples of conventional semiconductor battery charging control devices in which a similar flip-flop circuit is employed and a gate signal for a semiconductor power switching element is latched by a timing pulse.

In the above mentioned conventional semiconductor battery charging control devices, no measure was taken against the undesired possibility that the semiconductor power switching element may undergo additional on-off operation due to noise and disturbances caused by, for example, a protection circuit, or the possibility that the frequency of the actual on-off operation, i.e. the switching frequency, of the semiconductor switching element will exceed the PWM frequency, i.e. the frequency of carrier wave for the PWM as a result, certain problems have arisen in conventional device, such as an increase of switching loss and increase of electromagnetic induction noise due to the high speed switching.

With the above explained conventional semiconductor battery charging control device in which the gate signal is latched in response to a timing pulse by making use of a flip-flop circuit, the on-off frequency fluctuation is comparatively suppressed, however because of the requirements of the timing pulse generating circuit, the circuit scale of the semiconductor battery charging control device is increased which causes an increase in the cost of the device.

SUMMARY OF THE INVENTION

An object of the present invention is to provide a control device for a battery charging AC generator, such as used in a motor vehicle having a simple circuit structure and a low cost and which stabilizes the on-off frequency of operation of a semiconductor power switching element included therein, to thereby sufficiently suppress the switching loss increase as well as the electromagnetic induction noise generation.

For achieving the above object, the control device for a battery charging AC generator used in a motor vehicle is provided with synchronizing means which matches the on-off frequency of a switching signal for controlling a semiconductor power switching element with a frequency of the PWM carrier wave signal.

The synchronizing means operates to suppress the on-off frequency of the switching signal due to, for example, noises, and to forcedly match the on-off frequency of the switching signal with the PWM frequency.

Accordingly, the frequency of the actual on-off operation of the semiconductor power switching element matches the PWM frequency, with the result that the switching loss increase and the electromagnetic induction noise generation is reliably suppressed.

Further, during the start-up period of the battery charging AC generator, the wingings are in a thermal equilibrium condition at a low temperature wherein the resistance of the windings is low, so that the switching frequency of the semiconductor power switching element controlling the current flowing through the field winding is conventionally increased. The actual field current controlled by the semiconductor power switching element is a sum of a current flowing through the semiconductor power switching element during the on period thereof and a flywheel current flowing through a flywheel diode connected in parallel with the field winding at the moment when the semiconductor power switching element is turned off. Accordingly, when the switching frequency increases during the start-up period of the battery charging AC generator, the field current increases in comparison with the thermal equilibrium condition at a high temperature wherein the resistance of the field winding is high, so that the battery charging AC generator requires more torque from the internal combustion engine, which unbalances the distribution of the torque generated by the internal combustion engine and causes a slipping noise of the belt which mechanically couples the internal combustion engine with the battery charging AC generator, reducing the life of the belt, and sometimes causes engine stall.

However, with the present invention, the switching frequency of the semiconductor power switching element is controlled so as to be synchronized with the PWM frequency from the PWM signal generating circuit under all conditions, so that the above conventional drawbacks such as the slipping noise of the belt, the reduction in the life of the belt and possible engine stall during the start-up period of the battery charging AC generator is also prevented.

BRIEF DESCRIPTION OF THE DRAWINGS

FIG. 2(a) through FIG. 2(e) are waveform diagrams for explaining the operation of the first embodiment;

FIG. 3 is a graph illustrating a relationship between switching frequencies of a semiconductor power switching element included in the first embodiment, and switching loss and electromagnetic induction noise caused thereby;

FIG. 14 is a circuit diagram illustrating a gate drive circuit for a of control devices for a battery charging AC generator used in a motor vehicle according to the present invention;

FIG. 15(a) through FIG. 15(c) are respectively waveform diagrams for explaining an operation of the FIG. 14 gate drive circuit in comparison with a conventional device.

DESCRIPTION OF PREFERRED EMBODIMENTS

Hereinbelow, semiconductor battery charging AC generator control devices according to the present invention are explained in detail with reference to embodiments illustrated.

Figure 1:
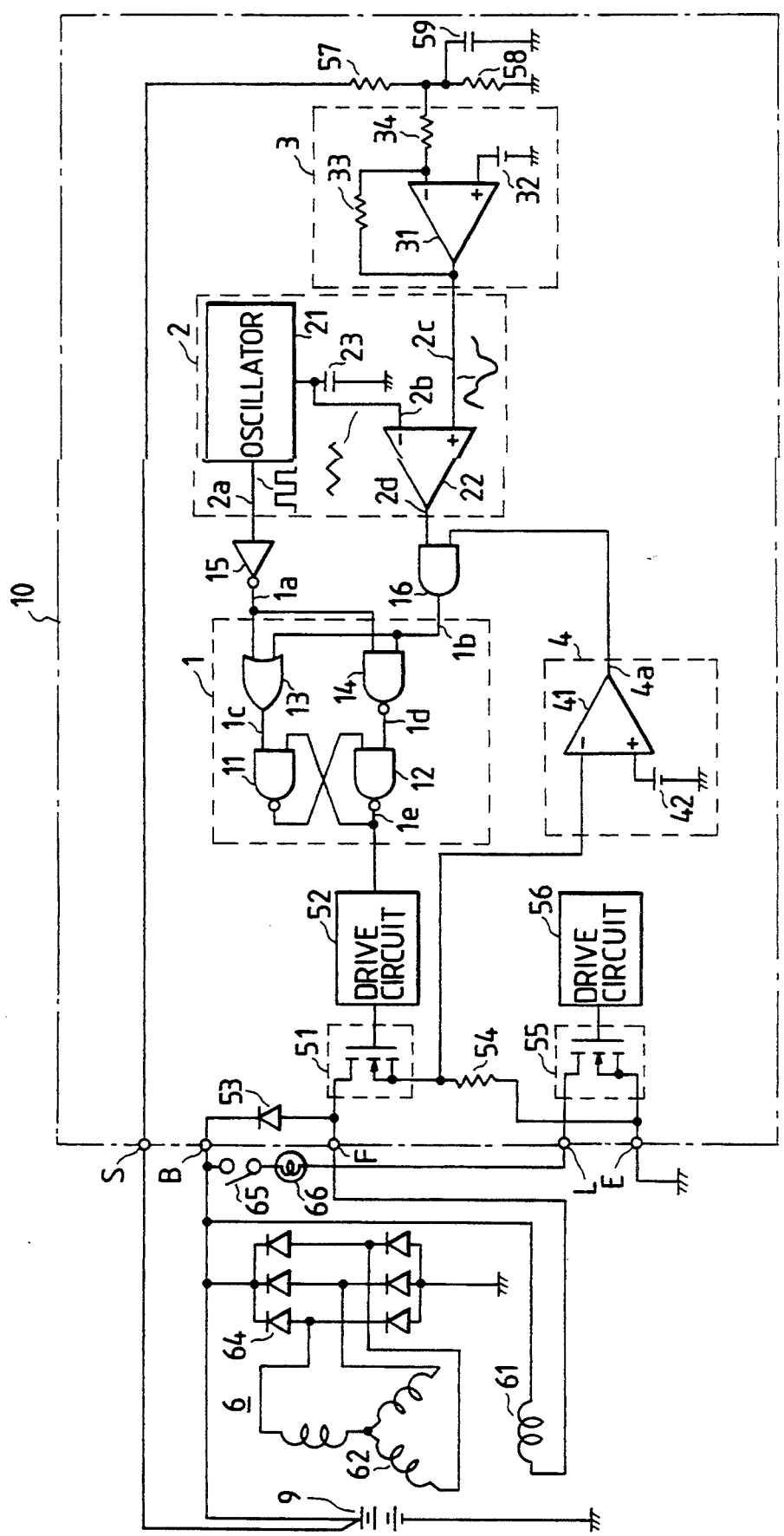
FIG. 1 is a circuit diagram illustrating a first embodiment of a control device for a battery charging AC generator used in a motor vehicle according to the present invention.

FIG. 1 shows one embodiment of the present invention as applied to an automobile. In the drawing, numeral 6 designates an AC generator or an alternator, numeral 9 identifies a battery and numeral 10 identifies an IC regulator or a semiconductor battery charging AC generator control device.

The AC generator 6 includes, as is well known, a field winding 61, armature windings 62 and rectifying diodes 64 and is adapted to be rotatably driven by an internal combustion engine of an automobile.

The battery 9 is charged by the AC generator 6 and supplies electric power to respective electrical devices in the automobile, as is well know in the art.

The IC regulator 10 includes a latch circuit 1, a PWM signal generating circuit 2, a voltage deviation detection circuit 3, a current detection circuit 4, a semiconductor power switching element 51 and a drive circuit 52 which supplies a switching signal to the semiconductor power switching element 51, and further includes another semiconductor power switching element 55 for controlling current flowing through a charge lamp 66 and another drive circuit 56 which supplies a control signal to the semiconductor power switching element 55. The function of the IC regulator 10 is to perform a PWM control for current flowing through the field winding 61 of the AC generator 6 by turning the semiconductor power switching element 51 on and off so as to maintain the voltage of the battery 9 at a predetermined level. Numeral 65 is a key switch.

A detail circuit structure and operation of the IC regulator 10 will be explained below.

The voltage deviation detection circuit 3 functions to detect a voltage of the battery 9 and to output an error voltage signal representing a difference between the detected voltage and a reference voltage value and comprises a comparator 31 which receives a voltage from the battery 9 after being divided at a predetermined ratio by resistors 57 and 58, compares the divided voltage with a voltage from a voltage source 32 providing a reference set value and detects a difference from the set value, which is outputted after amplification. Resistors 33 and 34 are respectively a feedback resistor and an input resistor for the comparator 31, and a capacitor 59 is used for noise absorption.

The PWM signal generating circuit 2 comprises an oscillator 21 generating a rectangular wave having a predetermined oscillating frequency, for example, 1 KHz, and comparator 22. The PWM signal generation circuit 2 outputs a pulse like output 2a, in other words a rectangular wave signal, from the oscillator 21, and further, functions to generate a PWM pulse 2d, in other words a PWM control signal, after comparing in the comparator 22 a reference triangular wave output 2b, in other words a PWM carrier wave signal, which is taken out after converting the rectangular wave signal into a triangular wave using a capacitor 23, with an output 2c from the voltage deviation detection circuit 3.

If the PWM pulse 2d is inputted to the drive circuit 52 as it is, the IC regulator 10 operates in the same way as the conventional battery charging AC generator control device operated through a PWM control. However, in the present embodiment, the latch circuit 1 is provided between the PWM signal generating circuit 2, which outputs the PWM pulse 2d, and the drive circuit 52 for the semiconductor power switching element 51, and so it forms a feature of the present embodiment. A diode 53 is a flywheel diode which permits a current flow from the field winding 61 when the semiconductor power switching element 51 is turned off.

In the present embodiment, in order to provide a function of limiting output current from the AC generator 6, the current detection circuit 4 is provided wherein current flowing through the field winding 61, which is detected by a series resistor 54 for current detection, is compared in a comparator 41 with a reference current value provided by a voltage source 42, and further, an AND logic circuit 16 is provided wherein a logical operation is performed on the PWM pulse 2d and an output 4a from the comparator 41, so that a logical operation signal 1b is outputted to the latch circuit 1.

The latch circuit 1 is constituted by a set-reset type flip-flop circuit formed by two NAND logic circuits 11 and 12, an OR circuit 13 and a NAND logic circuit 14, and functions to output an inverted signal 1a of a rectangular wave signal from the oscillator 21 formed through an inverter circuit 15 in accordance with set and reset timings of the resultant logic operation signal 1b.

The operation of the present embodiment, in particular the operation of the latch circuit 1, will be explained in detail with reference to FIG. 2(a) through FIG. 2(e).

As illustrated in FIG. 2(a), a reference triangular wave output 2b, which is inputted to a negative input terminal of the comparator 22, reverses its direction at voltage levels of VH and VL. A pulse output 2a as illustrated in FIG. 2(c), shows a high level during a period when the reference triangular output 2b rises from VL to VH and a low level during a period when the reference triangular output 2b drops from VH to VL, and so is synchronized with the reference triangular wave output.

The pulse output 2a from the oscillator 21 is a fundamental waveform of the PWM frequency and constitutes a switching frequency of the semiconductor power switching element 51.

The PWM pulse 2d, constituting an output of the comparator 22, frequently generates a high frequency pulse in response to the output 2c from the voltage deviation detection circuit 3. This is because the input gain of the comparator 22 is generally high and the output 2c of the voltage deviation detection circuit 3 is likely to be affected by a ripple voltage of the generator 6 and a switching noise. The same is true with regard to the comparator 41 in the current detection circuit 4.

Therefore, if the output 2c from the voltage deviation circuit 3, which constitutes an input for the comparator 22, shows a sharp fluctuation as illustrated in FIG. 2(a), a pulse train containing narrow width pulses is generated as the output 2d of the PWM signal generating circuit 2, as illustrated in FIG. 2(b), so that the switching frequency of the semiconductor power switching element 51 temporarily operates at a high frequency. The same is true when a pulse train containing narrow width pulses is generated as the output 4a of the current detection circuit 4.

FIG. 3 shows an extent of electromagnetic induction noise and switching loss with respect to the switching frequency of the semiconductor power switching element 51. As is apparent from FIG. 3, both the electromagnetic induction noise and the switching loss increase depending on an increase in switching frequency.

For suppressing the switching loss it is preferable to perform the switching operation at a frequency which is as low as possible. Further, when the level of a modulated frequency of the electromagnetic induction noise exceeds a predetermined level in an audible frequency band of human being, e.g. from 20 Hz to 20 KHz, the modulated frequency constitutes a radio noise which gives an uncomfortable feeling to the driver when the radio in the automobile is switched on. However, when the switching frequency is limited below 1 KHz, the level of the electromagnetic induction noise is suppressed and no problems arise.

As will be understood from FIG. 1 and FIG. 2(a) through FIG. 2(e), the latch circuit 1 takes in only once a leading edge changing from a low level to a high level of the output 1b of the AND gate 16, to which the output 2d of the PWM signal generating circuit 2 and the output 4a of the current detection circuit 4 are inputted, during a period when the output 2a of the oscillator 21 is at a low level and holds the output 1e at a high level. On the other hand, the latch circuit 1 takes in only once a trailing edge of the output 1b of the AND gate 16 during a period when the output 2a of the oscillator 21 is at a high level and holds the output 1e at a low level.

During a period when the output 1e of the latch circuit 1 is held at a low level and the output 2a of the oscillator 21 is at a high level, and when a leading edge of the output 1b of the AND gate 16 is generated and the high level condition of the output 1b is maintained, the output 1e of the latch circuit 1 takes a high level condition at the moment when the output 2a of the oscillator 21 changes from a high level to a low level and is held at a high level. In the same manner, during a period when the output 1e of the latch circuit 1 is held at a high level and the output 2a of the oscillator 21 is at a low level, the output 1e of the latch circuit 1 takes a low level condition at the moment when the output 2a of the oscillator 21 changes from a low level to a high level and is held at a low level.

As a result, the output 1e of the latch circuit 1 synchronizes with the output 2a of the oscillator 21 and the switching frequency of the semiconductor power switching element 51 is controlled so as not to exceed the PWM frequency, namely changes in synchronism with the PWM frequency and the semiconductor power switching element 51 performs a stable operation.

According to the present embodiment, even when a noise is generated in a detection voltage, fluctuation of the switching frequency is prevented and a stable switching operation at a constant frequency is achieved, and a semiconductor battery changing AC generator control device with no electromagnetic induction noise as well as with a less switching loss is obtained. Further, according to the present embodiment, no timing circuit is necessitated which simplifies the circuit structure, thereby a semiconductor battery charging AC generator control device which is easily integrated into an IC is obtained.

A second embodiment according to the present invention is explained with reference to FIG. 4.

Figure 4:
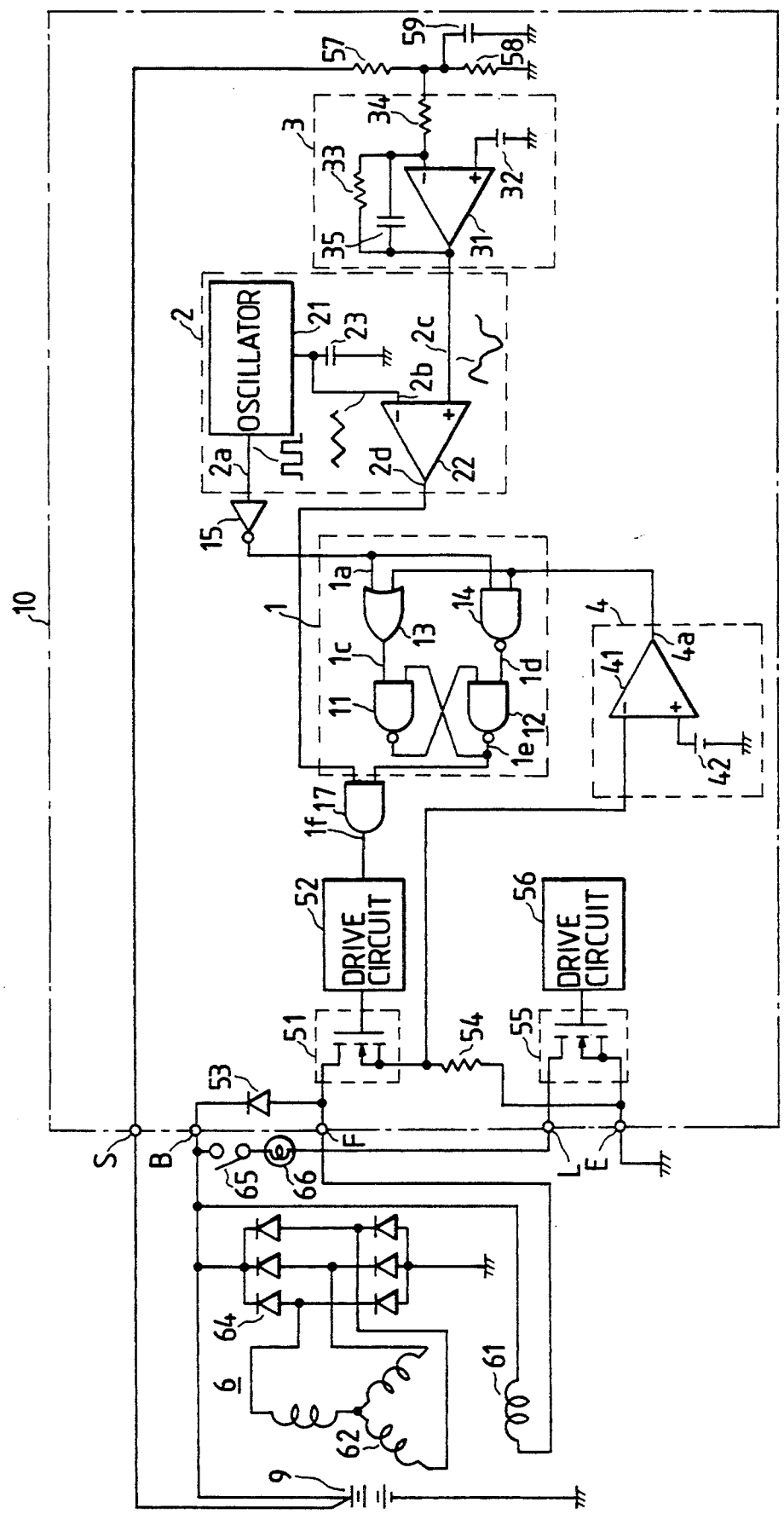
FIG. 4 is a circuit diagram illustrating a second embodiment of a control devices for a battery charging AC generator used in a motor vehicle according to the present invention.

The embodiment shown in FIG. 4 is particularly suitable when the influence of the noises caused by the current detection circuit 4 is significant. In the present embodiment, in order to prevent fluctuation in the PWM frequency due to the output 4a from the current detection circuit 4, the latch circuit 1 is provided between the current detection circuit 4 and an AND gate 17. The AND gate 17 performs a logical operation on the output 2d of the PWM signal generating circuit 2 and the output of the latch circuit 1 and the resultant logical operation signal 1f controls the switching operation of the semiconductor power switching element 51 via the drive circuit 52.

Further, in the present embodiment, noises relating to the PWM signal generating circuit 2 are suppressed either by providing a capacitor 35 in the voltage deviation circuit 3 or by stabilizing the output of the PWM signal generating circuit 2 through provision of a hysteresis in the comparator 22.

According to the present embodiment, even when the current detection circuit 4 is in operation and a current limitation of the semiconductor power switching element 51 is effected, a semiconductor battery charging AC generator control device which is stably operated at a constant PWM frequency is realized.

Figure 5:
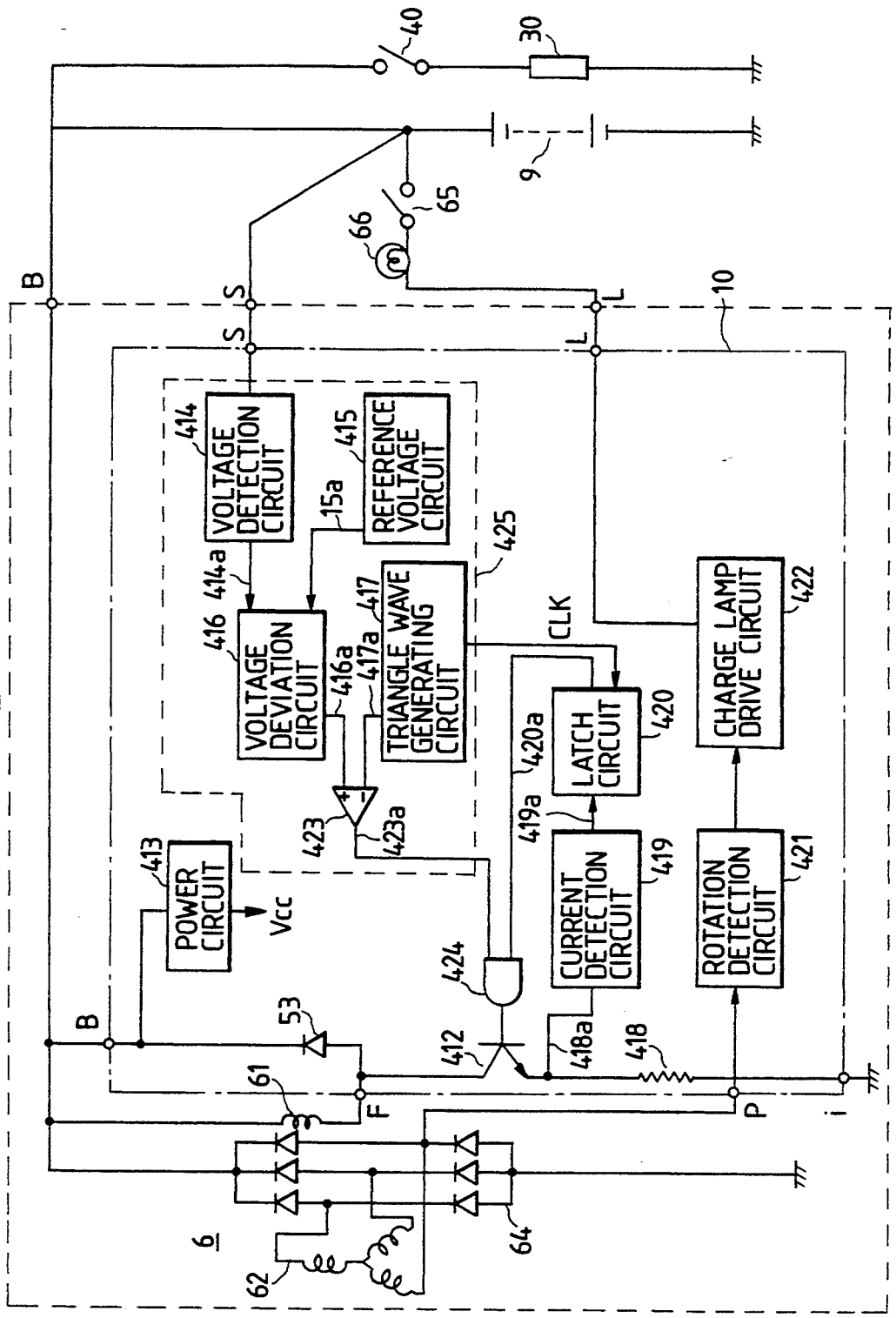
FIG. 5 is a system diagram illustrating a slightly modified form of the second embodiment.

FIG. 5 shows a system diagram of a slightly modified form of the second embodiment explained above with reference to FIG. 4, and in FIG. 5 some of the same reference numerals are used for the same or equivalent elements as in the previous embodiments. The field winding 61 of the AC generator 6 is mounted on a rotor not shown and is rotatingly driven by an internal combustion engine of a motor vehicle, and generates a rotating magnetic field when a power transistor 412, which is connected to a terminal F of the field winding 61, is controlled to be turned on to supply an exciting current to the field winding 61.

The flywheel diode 53 connected in paralell with the field winding 61 constitutes a circuit for a flywheel current which is generated when the power transistor 412 is turned off and operates to absorb switching noises.

The armature winding 62 is wound on a stater core (not shown) which faces the rotor with a predetermined gap and generates a three phase alternating current voltage depending on the magnitude of the rotating magnetic field generated by the field winding 61. The generated AC voltage is full-wave-rectified by the three phase full wave rectifier 64 and is converted to a DC current.

An output of the three phase full wave rectifier 64 is supplied to the battery 9 through an output terminal B of the AC generator 6 to charge the battery 9. At the same time, the output of the three phase full wave rectifier 64 is supplied from the output terminal B through a load switch 40 to an electric load 30, in other words electrical devices, such as a lamp.

The output terminal B, to which a plus terminal of the battery 9 is connected, is further connected to a power circuit 413 in the IC regulator 10. The power circuit 413 stabilizes the battery volatge and supplies a constant voltage Vcc to respective circuits in the IC regulator.

Figure 6A:
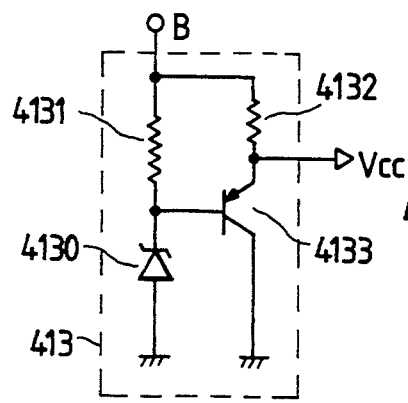
FIG. 6(a) through FIG. 6(f) are respectively circuit diagrams of examples of a power circuit, a voltage detection circuit, a reference voltage circuit, a voltage deviation circuit, a triangle wave generating circuit and a current detection circuit contained in the FIG. 5 embodiment.

FIG. 6(a) shows a detail of the power circuit 413 which is constituted by a zener diode 4130, a transistor 4133 of which the base potential is kept constant by the zener diode 4130 and resistors 4131 and 4132, so as to output a stabilized constant voltage Vcc from the collector of the transistor 4133.

A pulse width modulation (PWM) voltage control circuit 425 is constituted by a voltage detection circuit 414, a reference voltage circuit 415, a voltage deviation detection circuit 416, a triangular wave generation circuit 417 and a comparator 423, and the output of the battery 9 is connected to the voltage detection circuit 414 via terminal S.

Figure 6B:
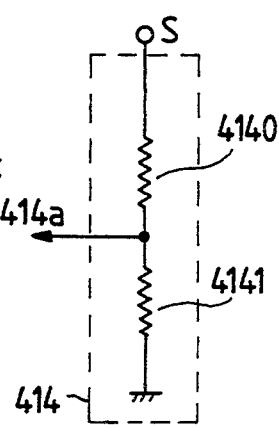

FIG. 6(b) shows a detail of the voltage detection circuit 414 which is constituted by a voltage dividing circuit including two resistors 4140 and 4141, so as to output a detection output 414a obtained by dividing a voltage of the battery 9 inputted from the terminal S at a predetermined dividing ratio.

The output 414a of the voltage detection circuit 414 is inputted to the voltage deviation detection circuit 416 wherein a deviation between the output 414a and a reference voltage 415a set by the reference voltage circuit 415 is calculated and the result is outputted as a deviation signal 416a.

Figure 6C:
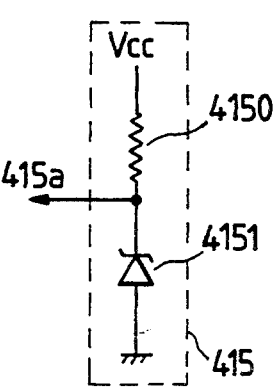

FIG. 6(c) shows a detail of the reference voltage circuit 415, which is constituted by a resistor 4150 and a zener diode 4151 connected in series with the resistor 4150 and outputs the reference voltage 415a which is a constant voltage determined by a zener voltage of the zener diode 4151.

Figure 6D:
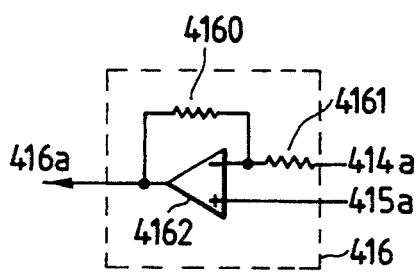

FIG. 6(d) shows a detail of the voltage deviation detection circuit 416 which is constituted by a comparator 4162, a feedback resistor 4160 and an input resistor 4161, and outputs the deviation signal 416a determined by a deviation between the detection output 414a from the voltage detection circuit 414 and the reference voltage 415a from the reference voltage circuit 415.

The output 416a of the voltage deviation circuit 416 is inputted to the comparator 423 along with a reference voltage in the form of a triangular wave signal 417a outputted from the triangular wave generation circuit 417. In the pulse width modulation (PWM) voltage control circuit 425, a PWM signal 423a is produced by the comparator 423 and is supplied to the base of the power transistor 412 via an AND circuit 424.

Figure 6E:
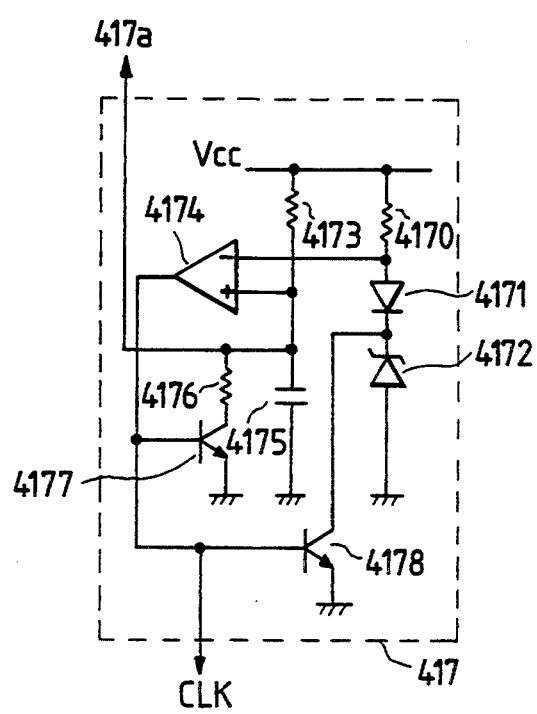

FIG. 6(e) shows a detail of the triangular wave generation circuit 417, which is constituted by a comparator 4174, a capacitor 4175, transistors 4177 and 4178, a diode 4171, a zener diode 4172 and resistors 4170, 4173 and 4176, and which generates clock pulses CLK in a rectangular wave form having a predetermined level and the triangular wave signal 417a.

When an output 420a from a latch circuit 420, which is explained in detail later, is at a high level, a PWM signal 423a from the comparator 423 is supplied to the base of the power transistor 412 via the AND circuit 424, with the result that the current flowing through the field winding 61 is PWM controlled and a voltage regulation function is obtained which maintains the voltage at the terminal B at a predetermined constant voltage, for example, 14(v).

A resistor 418 connected between the emitter of the power transistor 412 and ground works to convert the current flowing through the field winding 61 into a voltage signal 418a which is inputted to a current detection circuit 419.

Figure 6F:
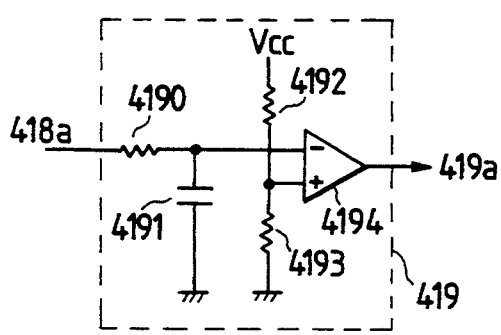

FIG. 6(f) shows a detail of the current detection circuit 419, which is constituted by a smoothing resistor 190, a capacitor 4191, resistors 4192 and 4193 for voltage dividing and a comparator 4194, and which outputs from the comparator 4194 a deviation output 419a determined by the voltage signal 418a and a reference voltage obtained by dividing the power source voltage Vcc using the resistors 4192 and 4193.

The output 419a from the current detection circuit 419 is inputted to the latch circuit 420, which is designed to operate by using the clock pulses CLK from the triangular wave generation circuit 417 as a latch signal.

Figures 7, 8:
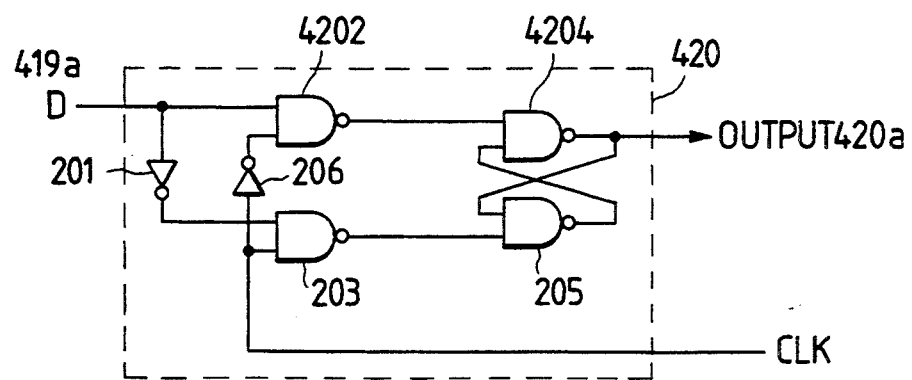
FIG. 7 is a circuit diagram for a latch circuit contained in the FIG. 5 embodiment.
FIG. 8 is an operating function table of the latch circuit contained in the FIG. 5 embodiment.

FIG. 7 shows a detail of the latch circuit 420, which is constituted by two inverter circuits 4201 and 4206 for level inversion, two NAND circuits 4202 and 4203 serving as a gate and two NAND circuits 4204 and 4205 forming a flip-flop. The function performed by the latch circuit 420 is illustrated in FIG. 8 in a form of operating function table.

Further, in the present embodiment, circuits necessary for lighting control of the charge lamp 66 are included. For this purpose, the neutral point of the three phase full wave rectifier 64 is connected to the input of a rotation detection circuit 421 via a terminal P and the output of the rotation detection circuit 421 is inputted to a charge lamp drive circuit 422. Further, the key switch 65 is connected between the battery 9 and the charge lamp 66 which is connected to the charge lamp drive circuit 422 via a terminal L.

Figure 9:
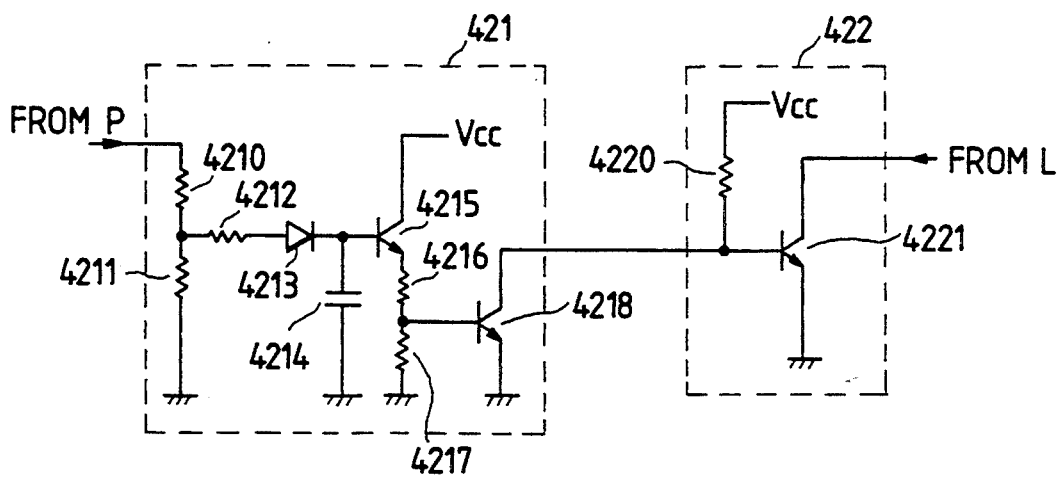
FIG. 9 is a circuit diagram for a rotation detection circuit and a charge lamp drive circuit contained in the FIG. 5 embodiment.

FIG. 9 shows a detail of the rotation detection circuit 421 and the charge lamp drive circuit 422, which are constituted by resistors 4210 and 4211 for voltage dividing, like resistors 4216 and 4217 for voltage dividing, a diode 4213 for rectification, a smoothing capacitor 4214, transistors 4215, 4218 and 4221 and a resistor 4220 for base biasing, and which operates in such a manner that when a voltage at the neutral point of the three phase full wave rectifier 64, which is supplied from the terminal P, is below a predetermined value the transistor 422 is maintained in an on condition, and when a voltage at the neutral point of the three phase full wave rectifier 64 exceeds the predetermined value, the transistor 4221 is turned off.

Accordingly, the change lamp 66 is designed to be lighted during a period before a predetermined voltage is generated at the armature winding 62 after the key switch 65 is turned on and the AC generator is started to be rotatatively driven by the internal combustion engine.

Now, a field current limiting operation, namely, a torque limiting operation by the present embodiment will be explained.

The deviation output 419a from the current detection circuit 419 is modified in the latch circuit 420 into an output 420a, which is synchronized with the latch signal, in other words, clock pulses CLK, and is inputted to the AND circuit 424 together with the output 423a from the comparator 423. The output from the AND circuit 424 is supplied to the base of the power transistor 412.

Now, assuming that a necessary current for the field winding 61 is $I_F$(hot) when the temperature of the AC generator becomes high, namely, when the AC generator reaches to it's thermal equilibrium condition after the engine warming-up operation, the current $I_F$(hot) is expressed as follows;

$$I_F(hot) = I_{F1} + I_{F2}$$

wherein, $I_{F1}$: collector current flowing through the power transistor 412, and $I_{F2}$: current flowing through the flywheel diode 53.

Since the current $I_{F2}$ is generated by a counter electro-motive force induced by an inductive component in the field winding 61, the magnetude of the current $I_{F2}$ varies depending on the switching frequency of the power transistor 412.

Therefore, the current signal $I_{F1}$ is inputted to the current detection circuit after converting the same into a voltage level via the resistor 418.

The current detection circuit 419 is constituted by the resistors 4190, 4192 and 4193, the capacitor 4191, and the comparator 4194, as illustrated in FIG. 6(f), wherein the resistors 4192 and 4193 are connected in series between the voltage source Vcc and ground, and the point of connection of these resistors 4192 and 4193 is connected to a non-inverting input terminal of the comparator 4194 and the potential at this point constitutes a reference voltage.

On the other hand, the resistor 4190 and the capacitor 4191 constitute an integration circuit which averages the voltage signal 418a detected at the resistor 418, representing the current flowing through the power transistor 412, and the output from the integration circuit is connected to the inverting input terminal of the comparator 4194.

The deviation output 419a from the comparator 4194 is inputted to the latch circuit 420 which is illustrated in detail in FIG. 7, and is constituted by the NAND circuits 4202, 4203, 4204 and 4205, and the inverter circuits 4201 and 4206. The deviation output 419a is inputted as data D to the latch circuit 420 along with the rectangular wave output generated from the triangular wave generation circuit 417 in the form of the clock pulses CLK having a constant frequency, and the latch circuit 420 performs the operations as illustrated in the function table in FIG. 8.

The output 420a from the latch circuit 420 is inputted into the AND circuit 424 wherein an AND logic operation is performed with the output 423a constituting another input from the PWM voltage control circuit 425.

The output of the AND circuit 424 is connected to the base of the power transistor 412. As a result, the current $I_{F1}$ is controlled by the power transistor 412.

Now, assuming that the magnitude of current $I_{F1}$ is less than the predetermined value and the average value of the voltage signal 418a is less than the voltage applied at the non-inverting input terminal of the comparator 4194 in the current detection circuit 419, the output 419a of the comparator 4194 is set to level "1"; accordingly, the output 420a of the latch circuit 420 is also set to level "1". Therefore, in the output of the AND circuit 424, the PWM signal 423a from the PWM voltage control circuit 425 appears thereby performing voltage control through PWM.

When the magnitude of current $I_{F1}$ exceeds the predetermined value and the average value of the voltage signal 418a exceeds the voltage applied at the non-inverting input terminal of the comparator 4194 in the current detection circuit 419, the output 419a of the comparator 4194 is set to level "0" and the output 420a of the latch circuit 420 is also set to level "0". Therefore, the output of the AND circuit 424 is fixed to level "0". As a result, the PWM signal 423a from the PWM voltage control circuit 425 is prevented from being outputted from the AND circuit 424, with the result that the power transistor 412 is turned off and the current $I_{F1}$ is interrupted.

Figure 10:
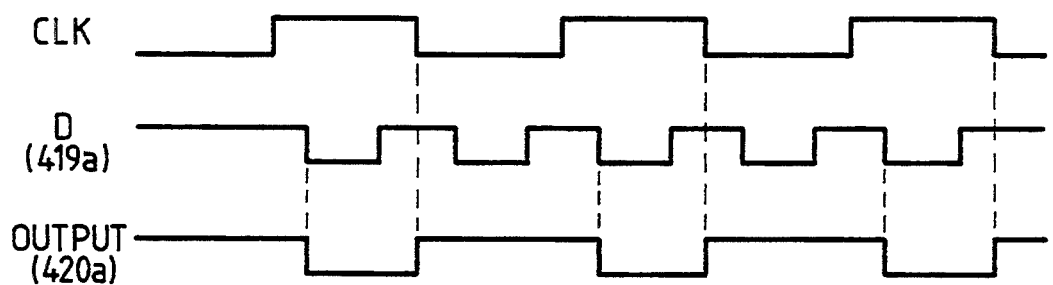
FIG. 10 is an operation timing chart for explaining an operation of the latch circuit shown in FIG. 7.

Now, the switching frequency of the power transistor 412 as a result of the output 419a from the current detection circuit 419 will be investigated for a situation in which the above operation is repeated continuously. Through the operation of the latch circuit 420 having an operation timing as illustrated in FIG. 10, the frequency of the switching of the power transistor 412 which is performed via the AND circuit 424 is controlled at the same frequency as in the PWM control, even when the torque limiting operation is effected. As a result, the current $I_{F1}$ is always controlled at a predetermined constant value.

According to the present embodiment, the current flowing through the flywheel diode 53 is kept constant, thus a correct field current limiting is enabled, thereby reliably suppressing an increase in the output of the AC generator 6 during a low temperature condition while guaranteeing the output of the AC generator 6 during a high temperature condition and preventing an excess torque of the AC generator 6 before reaching a high thermal equilibrium condition. As a result, the life of the belt mechanically coupling the internal combustion engine and the AC generator 6 is increased, the noisy slipping noise produced by the belt is prevented, and further a possible engine stall during the starting period is sufficiently suppressed.

According to the present embodiment, the uppermost frequency of the field current switching operation during the torque limiting operation is limited to the frequency of the PWM control for the voltage control, with the result that the current flowing through the flywheel diode is kept unchanged, and accordingly a correct field current limiting is made possible.

Further, according to the present embodiment, the frequency signal which is necessary to determine the uppermost frequency of the field current switching operation during the torque limiting operation is obtained from the frequency signal of the PWM voltage control system, the circuit structure of the present embodiment is simplified and the production cost thereof is also reduced.

Figure 11:
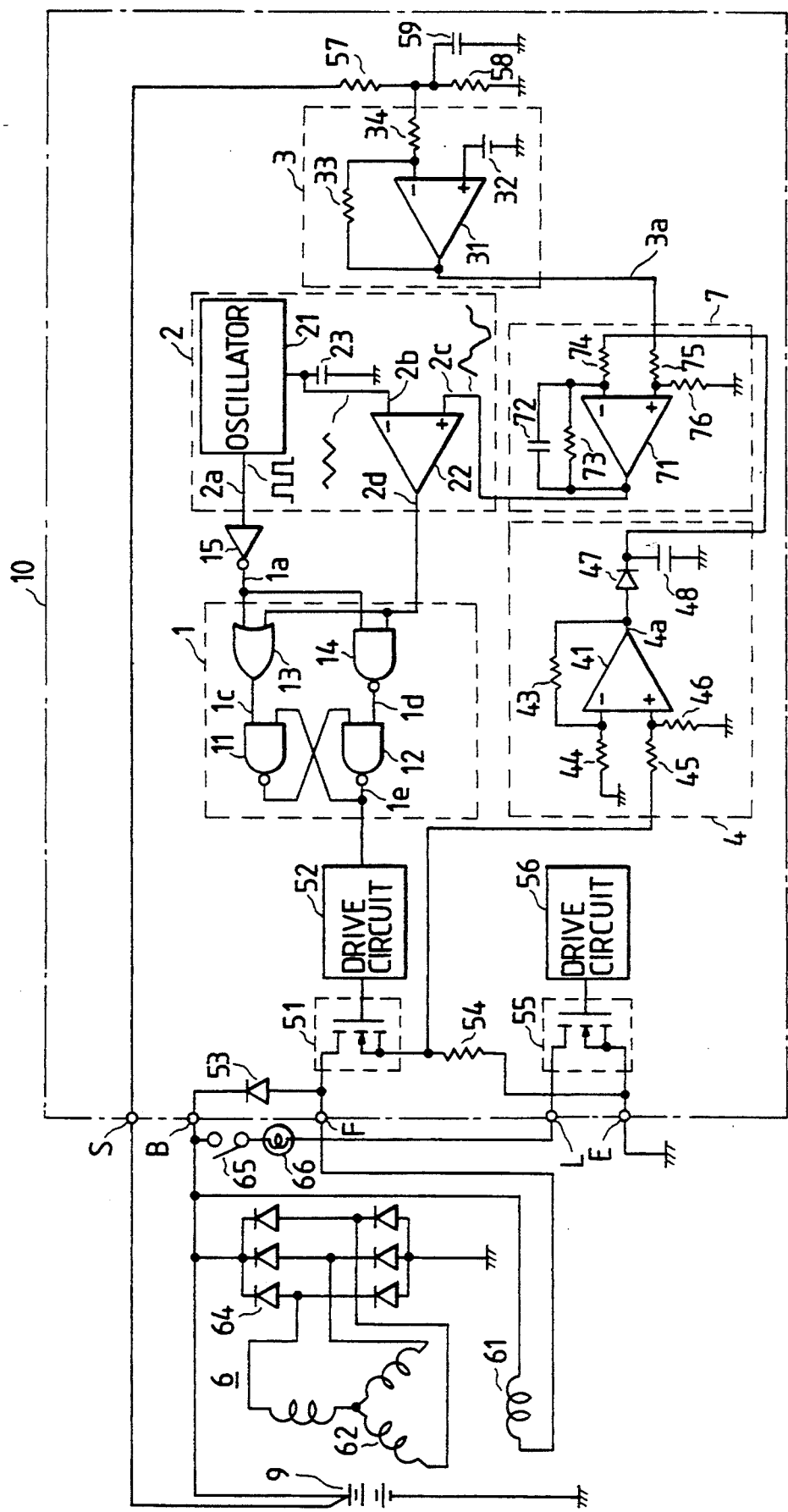
FIG. 11 is a circuit diagram illustrating a third embodiment of a control device for a battery charging AC generator used in a motor vehicle according to the present invention.

A third embodiment of the present invention will be explained with reference to FIG. 11.

The present embodiment is designed to control an average current of the semiconductor power switching element 51, in other words, an average current of the field winding 61, to make it constant. For this purpose, the output 3a of the voltage deviation circuit 3 and the output of the current detection circuit 4 are further processed in a current deviation circuit 7 for performing an adding and subtracting operation, and the result is compared through the comparator 22 in the PWM signal generating circuit 2.

The current detection circuit 4 amplifies the voltage detected through the resistor 54 using an amplifier 41 and resistors 43, 44, 45 and 46 and takes out the voltage signal 4a. Since the output voltage signal 4a shows an interruptive form, the voltage signal is averaged by a peak hold circuit including a diode 47 and a capacitor 48, and is inputted to the inverting input terminal of the amplifier 71 in the current deviation circuit 7 through a resistor 74. The current deviation circuit 7 performs an analogue processing on the output 3a of the voltage deviation detection circuit 3 and the output of the current detection circuit 4 and amplifies the difference therebetween. The output 2c of the current deviation circuit 7 is inputted to a non-inverting input terminal of the comparator 22 in the PWM signal generation circuit 2 to form a PWM signal. The current detection circuit 4 outputs an amplified output depending on a resistance ratio of the resistors 44 and 43, and the resistors 45 and 46 which defines a gain of the amplifier 41. In the same manner the current deviation circuit 7 outputs an amplified output depending on the resistance ratio of the resistors 74 and 73, and resistors 75 and 76 which defines the gain of the amplifier 71. A capacitors 72 connected in parallel with the resistor 73 is for phase compensation.

The latch circuit 1 is disposed between the PWM signal generation circuit 2 and the drive circuit 52, and the switching operation of the semiconductor power switching element 51 is controlled via the drive circuit 52.

According to the present embodiment, when the current detection circuit 4 is rendered operative, the average current flowing through the semiconductor power switching element 51 is controlled, and a semiconductor battery changing AC generator control device operating at a constant and stable PWM frequency is realized.

Figure 12:
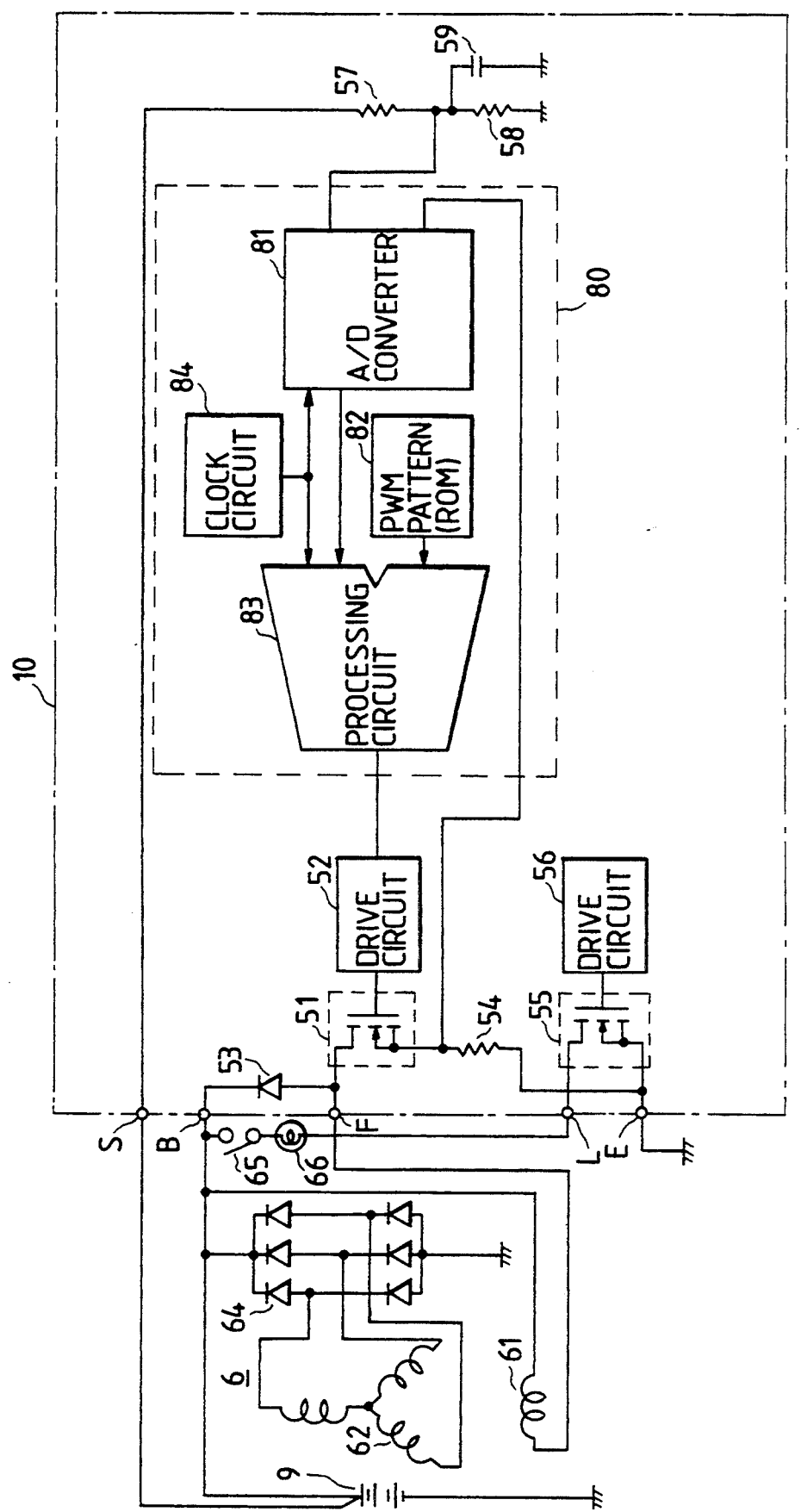
FIG. 12 is a circuit diagram illustrating a fourth embodiment of a control device for a battery charging AC generator used in a motor vehicle according to the present invention.

A fourth embodiment of the present invention is explained with reference to FIG. 12.

The present embodiment is designed to perform a PWM control on the semiconductor power switching element 51 by making use of a digital processing device 80, such as a microcomputer, wherein the battery voltage is taken into an A/D converter 81 after being divided by the resistors 57 and 58, and further the current flowing through the semiconductor power switching element 51, in other words the current flowing through the field winding 61, is also taken into the A/D converter 81 after being converted into a voltage signal through the detection resistor 54.

Digitalized data of the detection values in the A/D converter 81 and a PWM pattern stored in a ROM 82 are taken into a processing circuit 83 in synchronism with timing pulses from a clock circuit 84, and the duty of the PWM pulses is determined so as to optimize the battery voltage and the current flowing through the semiconductor power switching element 51.

Herein, when the processing circuit 83 is designed to limit maximum PWM frequencies corresponding to the respective PWM patterns, the PWM frequency is always stabilized and an increase of the switching frequency of the semiconductor power switching element 51 over the PWM frequency due to noises is prevented.

The stability of the switching frequency according to the present embodiment is determined solely by the clock frequency and the accuracy of the clock circuit 84.

Since the digital processing means 80 can be constituted by digital logic elements, which are suitable for integration, a semiconductor battery charging AC generator control device which is suitable for integration and permits a highly accurate PWM control can be realized by the present invention.

Figure 13:
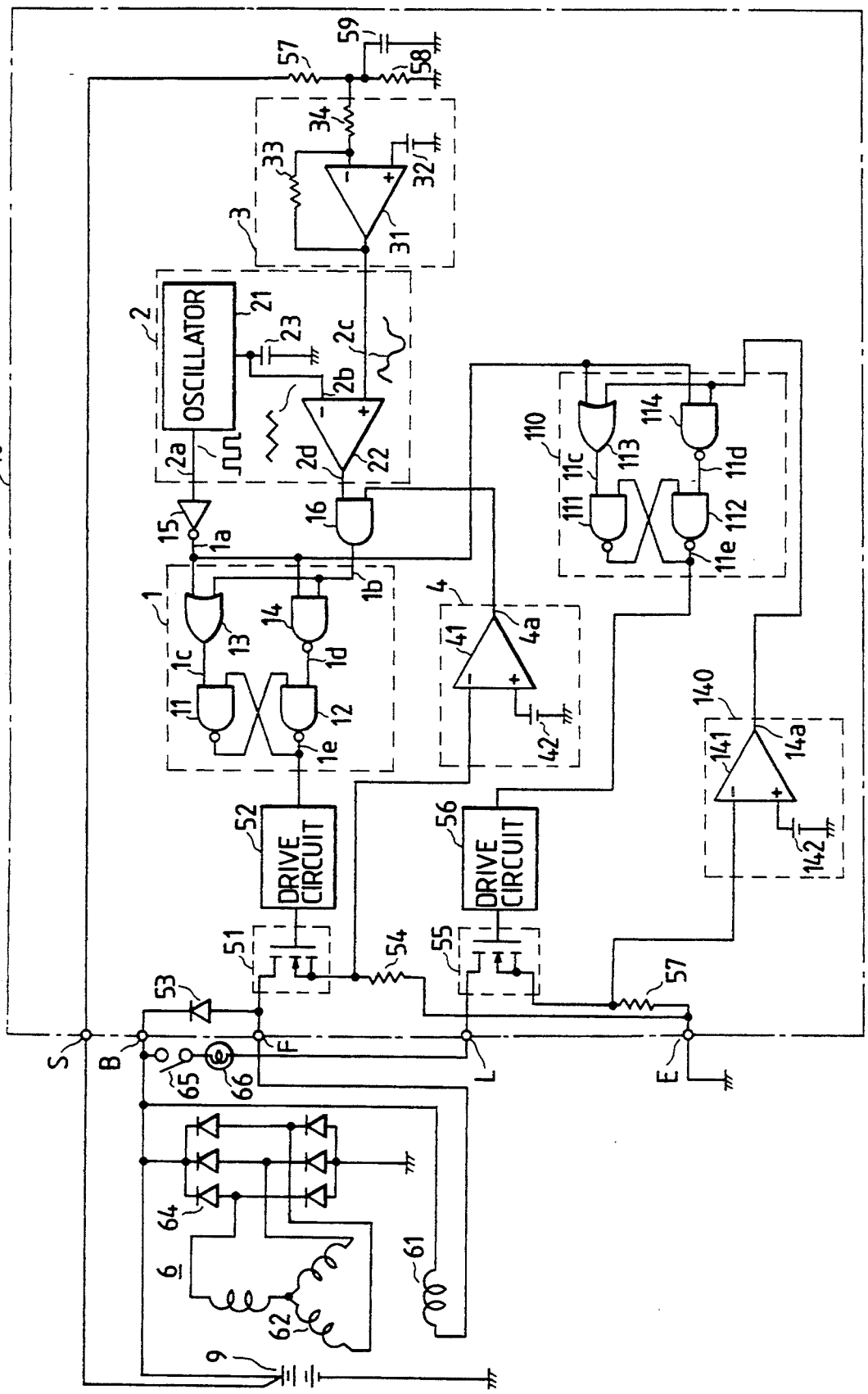
FIG. 13 is a circuit diagram illustrating a fifth embodiment of a control device for a battery charging AC generator used in a motor vehicle according to the present invention.

A fifth embodiment of the present invention is explained with reference to FIG. 13.

In the present embodiment, another latch circuit 110 is provided for controlling a drive circuit 56 for another semiconductor switching element 55, which lights the charge lamp 66 via the key switch 65, and for stabilizing the switching frequency of the semiconductor switching element 55. The other circuit structure is the same as that in FIG. 1 and the circuit structure of the latch circuit 110 is also the same as that of the latch circuit 1 in FIG. 1.

The current flowing through the semiconductor switching element 55 is converted into a voltage signal through a resistor 57 and is compared with a set voltage of a voltage source 142 by a comparator 141 in the current detection circuit 140. When the converted voltage signal exceeds the set voltage level, the output of the comparator 141 is inverted and the semiconductor switching element 55 is interrupted via the latch circuit 110 and the drive circuit 56 to limit the operating current.

noise is

Accordingly, even when a high frequency superposed on the output of the comparator 141, the latch circuit 110 operates so as not to accept a pulse input having an interval less than a predetermined interval which is determined by the clock pulse 2a supplied from the oscillator 21 in the PWM signal generating circuit 2.

In place of the clock pulse 2a from the oscillator 21, the latch circuit 110 can use any other clock pulse signals, because the semiconductor switching element 55 is not PWM controlled in this embodiment. Although the present embodiment is explained in connection with a current limiting control for the semiconductor switching element 55, the present embodiment is also effective for a protective control of overvoltage and overheating of the semiconductor switching element 55.

According to the present embodiment, a semiconductor battery changing AC generator control device, which suppresses occurrence of flickering of the charge lamp 66 as well as effects a stable operation without increasing the electromagnetic induction noise in the same manner as in the embodiment shown in FIG. 1, is realized.

A sixth embodiment of the present invention is explained with reference to FIG. 14.

In the present embodiment, a power MOSFET is used for the semiconductor power switching element 51 and instead of providing the separate latch circuit 1 as in the provious embodiments, the drive circuit 52 is designed to include a function of the latching circuit 1 by making use of a characteristic of the MOSFET.

In the semiconductor power switching element 51, such as a power MOSFET and IGBT, there appears between the gate and source an electrostatic capacitor 250, as illustrated; therefore, in order to turn on and turn off the power MOSFET, it is necessary to charge and discharge the electrostatic capacitor 250 between the gate and source.

For this purpose, the drive circuit 52 is constituted by constant current sources 201 and 202, semiconductor switching elements 203 and 204, and inverters 206, 207 and 208. The electrostatic capacitor 250 between the gate and source of the power MOSFET constituting the semiconductor power switching element 51 is charged by the constant current source 201 while limiting the charging current below a predetermined value, and the discharging of the electrostatic capacitor 250 is controlled by the constant current source 202 while limiting the discharging current below a predetermined value, to thereby suppress the operating speed, in other words the responding speed of the semiconductor power switching element 51, so that it is non-responsive to a frequency higher than the PWM frequency, and thus the function of the latch circuit 1 is incorporated therein.

The on and off operation of the semiconductor power switching element 51, in other words the switching operation of charging and discharging of the electrostatic capacitor 250 between the gate and source, is performed by positively inverting the PWM signal from the PWM signal generation circuit 2 using the inverters 207 and 208, by negatively inverting the same using the inverter 206 and by complementary switching the same with the switching elements 203 and 204.

Accordingly, by setting the current value from the constant current sources 201 and 202 at a predetermined value, the operating speed of the power MOSFET constituting the semiconductor power switching element 51 is varied, with the result that the switching frequency of the semiconductor power switching element 51 is maintained below the PWM frequency.

The operation of the FIG. 14 embodiment will be explained with reference to FIG. 15(a), FIG. 15(b) and FIG. 5(c). When a high frequency noise is generated in the PWM signal illustrated in FIG. 15(a), the gate voltage of the power MOSFET constituting the semiconductor power switching element 51 in a conventional device responds quickly, as indicated by a dashed curve in FIG. 15(b). Therefore as seen from the voltage $V_F$ applied on the load 60, the power MOSFET performs a switching operation of a higher frequency than the PWM frequency in accordance with the high speed gate voltage variation, as illustrated by the dashed curve in FIG. 15(c), wherein tf represents the falling time of the load voltage $V_F$ and tr represents the rising time thereof.

On the other hand, in the FIG. 14 embodiment, the charging and discharging are performed at a constant current flow rate, and therefore the response of the gate voltage $V_G$ is delayed and the gate voltage $V_G$ insufficiently rises and drops in response to the high frequency noise, as illustrated by a solid curve in FIG. 15(b). As a result, the semiconductor power switching element 51 is prevented from responding to the high frequency noise and the frequency of the load voltage $V_F$; in other words, the switching frequency is sufficiently stabilized below the PWM frequency. The rising time tr and the falling time tf can be changed by varying the set current value of the constant current sources 201 and 202.

According to the present embodiment, a semiconductor battery charging AC generator control device is provided, which operates in particular to decrease electromagnetic induction noises which are caused by the rising and falling operation of the semiconductor power switching element 51.

Figure 16:
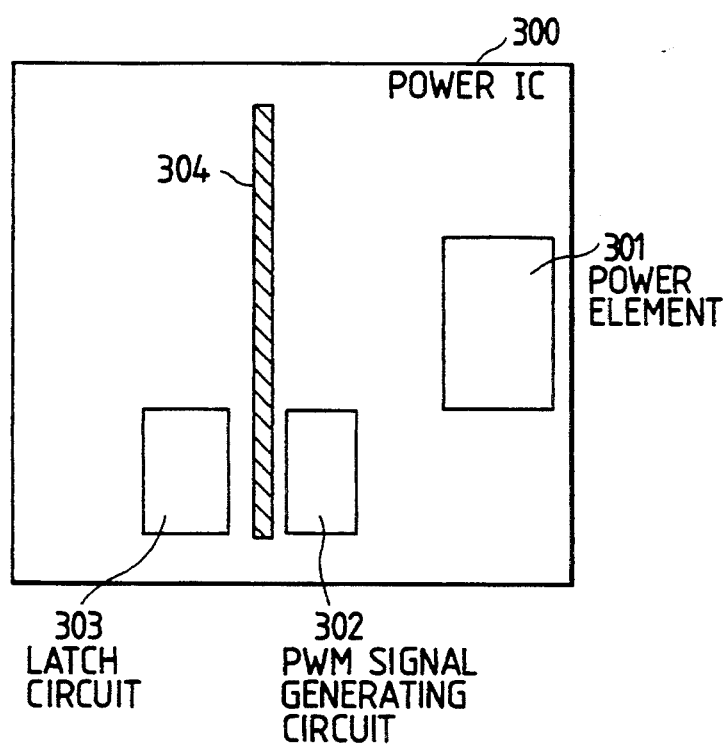
FIG. 16 is a layout diagram of a control device for a battery charging AC generator used in a motor vehicle according to the present invention when the same is formed into a power integrated circuit.

FIG. 16 is an example of the layout of the semiconductor battery charging AC generator control device according to the present invention when integrated into a power IC 300, which is formed by incorporating a power element 301 including, for example, the circuits other than the latch circuit 1 and the PWM signal generating circuit 2 in FIG. 1 embodiment, a PWM signal generating circuit 302 constituting an analogue circuit and a latch circuit 303 constituting a digital circuit. Along the boundary of the PWM signal generating circuit 302 and the latch circuit 303, a guard band 304 for noise shield is provided for preventing digital noises from mixing into the analogue circuit.

The shape of the guard band 304 is not limited if it one is a conductive body; however it is preferable that it have a width more than 10 μm and be connected to a point having a common potential such as ground, to maintain its potential constant.

According to the present embodiment, a semiconductor battery charging AC generator control device, which, sufficiently prevents erroneous PWM operations, performs a stable operation and is suitable for size reduction, is realized.

According to the present invention, with a simple circuit structure, the switching loss of the semiconductor power switching element included in the semiconductor battery charging AC generator control device operating on the basis of PWM control and the electromagnetic induction noises induced by a high speed switching thereof are reduced; and further with a simple circuit structure both the size of the device and the production cost of the device are reduced.

We claim:

1. A control device for a battery charging AC generator system for a motor vehicle, which system includes an AC generator, a rectifier device connected between output terminals of the AC generator, a battery to be charged by the AC generator and a flywheel diode connected in parallel with the field winding, said control device comprising:
- a semiconductor power switching element connected in series with the field winding of the AC generator for performing switching control of a current flowing through the field winding;
- a voltage detection resistor connected in parallel with the battery for detecting a voltage of the battery;
- means coupled to said voltage detection resistor for determining a voltage proportional to a deviation of the detected voltage of the battery from a reference voltage and for producing a voltage deviation signal representing said voltage proportional to said deviation;
- means for generating a PWM signal based on said voltage deviation signal from said voltage deviation determining means for causing on and off operation of said semiconductor power switching element;
- means for limiting the switching frequency of operation of said semiconductor power switching element to below a predetermined frequency;
- a current detection resistor connected in series with said semiconductor power switching element for detecting a current flowing through the field winding of said AC generator; and
- current determining means for determining whether the current detected by, said current detection resistor exceeds a constant reference current and for generating a turn off signal for said semiconductor power switching element when the detected current is determined to have exceeded the constant reference current;
- wherein said switching frequently limiting means is a latch circuit which operates in response to a clock signal from said PWM signal generating means.

2. A control device for a battery charging AC generator for a motor vehicle according to claim 1, further comprising logical processing means for logically processing the PWM signal from said PWM signal generating means and the turn off signal from said current determining means and for outputting a signal to control said latch circuit.

3. A control device for a battery charging AC generator for a motor vehicle according to claim 1, further comprising logical processing means for logically processing the PWM signal from said PWM signal generating means and a latch signal from said latch circuit to which the turn off signal from said current determining means is inputted and for outputting a switching signal to control said semiconductor power switching element.

4. A control device for a battery charging AC generator for a motor vehicle according to claim 1, further comprising processing means for processing the voltage deviation signal from said voltage deviation determining means and the turn off signal from said current determining means and for outputting a signal to control said PWM signal generating means.

5. A control device for a battery charging AC generator for a motor vehicle according to claim 1, further comprising:
- a series circuit, including a key switch, a charge lamp, a semiconductor switching element and a further current detecting resistor, to be connected between the output terminals of the rectifier device;
- further means for determining whether a detected current from the further current detecting resistor exceeds another reference current and for generating another turn off signal for the semiconductor switching element when the detected current is determined to have exceeded the other reference current; and
- a further latch circuit, which operates, in response to a clock signal from said PWM signal generating means and the other turn off signal from the further current determining means, to output a latch signal for turning on and off said semiconductor switching element.

6. A control device for a battery charging AC generator for a motor vehicle according to claim 1, wherein said voltage deviation determining means, said PWM signal generating means, said frequency limiting means, and said current determining means are formed into a digital processing means which includes an A/D converter for converting the detected voltage from said voltage detection resistor and the detected current from said current detection resistor into respective digital signals, a ROM for storing PWM patterns, a processing circuit for determining an optimum duty of a PWM pulse for said semiconductor power switching element based on the converted digital signals from said A/D converter and a PWM pattern inputted from said ROMA and a clock circuit for controlling input timing of the converted digital signals from said A/D converter and the PWM pattern from said ROM to said processing circuit.

7. A control device for a battery charging AC generator for a motor vehicle according to claim 1, wherein said semiconductor power switching element is a MOSFET and said frequency limiting means is means for limiting charging and discharging current for a stray capacitance between a gate and a source of said MOSFET.

8. A control device for a battery charging AC generator for a motor vehicle according to claim 1, wherein said semiconductor power switching element, said voltage detecting resistor, said voltage deviation determining means, said PWM signal generating means, said latch circuit, said current detecting resistor and said current determining means are integrated into an IC, and said PWM signal generating means is separated from said latch circuit via a guard band for noise shielding.

9. A control device for a battery charging AC generator system for a motor vehicle, which system includes an AC generator, a rectifier device connected between output terminals of the AC generator, a battery to be charged by the AC generator and a flywheel diode connected in parallel with the field winding, said control device comprising:
- a semiconductor power switching element connected in series with the field winding of the AC generator for performing switching control of a current flowing through the field winding;
- a voltage detection resistor connected in parallel with the battery for detecting a voltage of the battery;
- means coupled to said voltage detection resistor for determining a voltage proportional to a deviation of the detected voltage of the battery from a reference voltage and for producing a voltage deviation signal representing said voltage proportional to said deviation;
- means for generating a PWM signal based on said voltage deviation signal from said voltage deviation determining means for causing on and off operation of said semiconductor power switching element;

means for limiting the switching frequency of operation of said semiconductor power switching element to below a predetermined frequency;

a current detection resistor connected in series with said semiconductor power switching element for detecting a current flowing through the field winding of said AC generator; and current determining means for determining whether the current detected by said current detection resistor exceeds a constant reference current and for generating a turn off signal for said semiconductor power switching element when the detected current is determined to have exceeded the constant reference current;

wherein said voltage deviation determining means, said PWM signal generating means, said frequency limiting means, and said current determining means are formed into a digital processing means which includes an A/D converter for converting the detected voltage from said voltage detection resistor and the detected current from said current detection resistor into respective digital signals, a ROM for storing PWM patterns, a processing circuit for determining an optimum duty of a PWM pulse for said semiconductor power switching element based on the converted digital signals from said A/D converter and a PWM pattern inputted from said ROM, and a clock circuit for controlling input timing of the converted digital signals from said A/D converter and the PWM pattern from said ROM to said processing circuit.

10. A control device according to claim 1, wherein said voltage deviation signal is an analog signal.

11. A control device according to claim 9, wherein said voltage deviation signal is an analog signal.

12. A control device for a battery charging AC generator system for a motor vehicle, which system includes an AC generator, a rectifier device connected between output terminals of the AC generator, a battery to be charged by the AC generator and a flywheel diode connected in parallel with the field winding, said control device comprising:

a semiconductor power switching element connected in series with the field winding of the AC generator for performing switching control of a current flowing through the field winding;

a voltage detection resistor connected in parallel with the battery for detecting a voltage of the battery;

means coupled to said voltage detection resistor for determining a voltage proportional to a deviation of the detected voltage of the battery from a reference voltage and for producing a voltage deviation signal representing said voltage proportional to said deviation;

means for generating a PWM signal based on said voltage deviation signal from said voltage deviation determining means for causing on and off operation of said semiconductor power switching element; and means for limiting the switching frequency of operation of said semiconductor power switching element to below a predetermined frequency;

wherein said switching limiting means is a latch circuit which operates in response to a clock signal from said PWM signal generating means.

13. A control device according to claim 12, wherein said voltage deviation signal is an analog signal.

* * * * *